Jan. 12, 1960   G. A. LYON   2,920,921
WHEEL COVER
Filed July 22, 1955
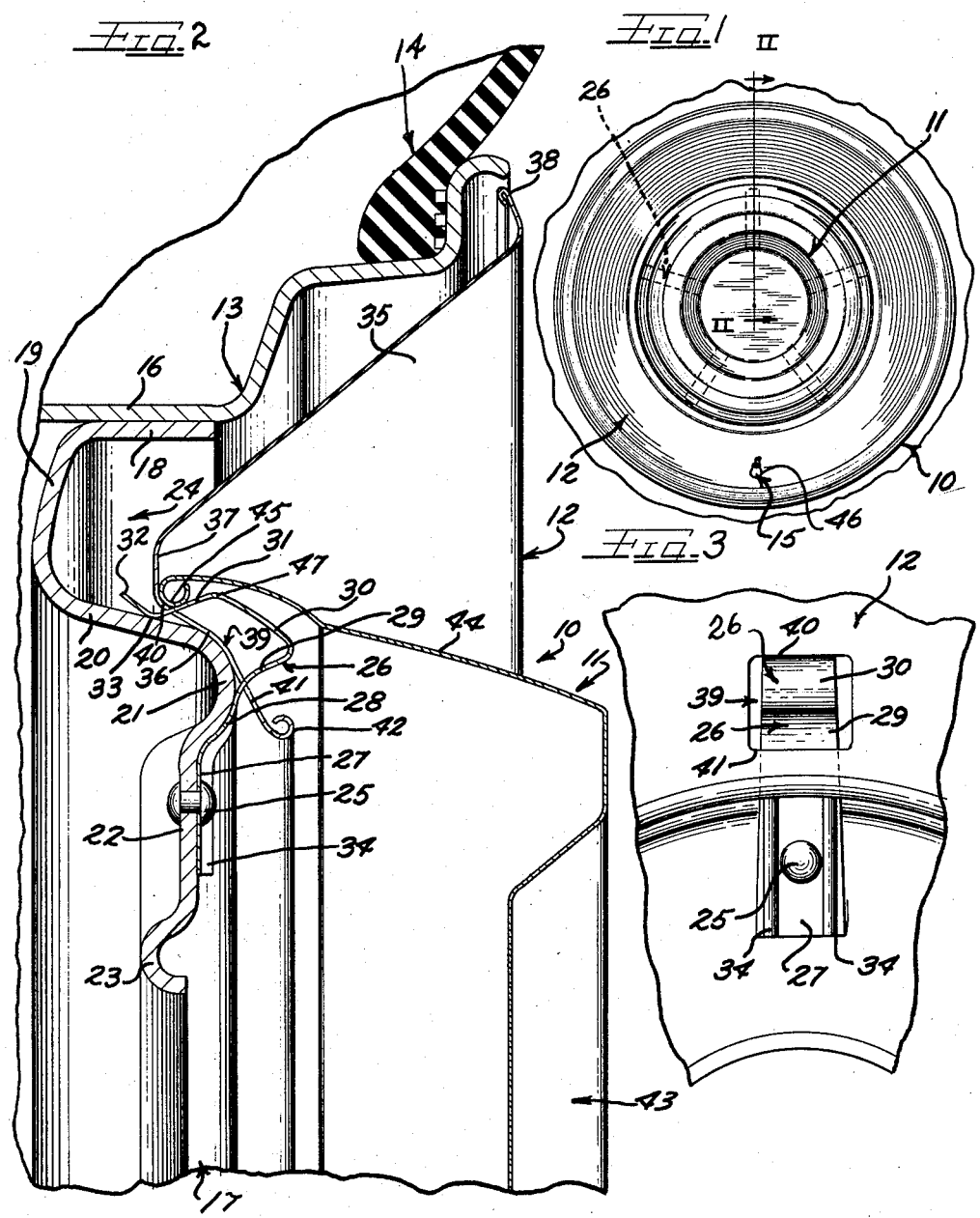
Inventor
GEORGE ALBERT LYON United States Patent Office 2,920,921
Patented Jan. 12, 1960

2,920,921

WHEEL COVER

George Albert Lyon, Detroit, Mich.

Application July 22, 1955, Serial No. 523,746

7 Claims. (Cl. 301—37)

This invention relates to wheel structures and more particularly to a cover for disposition on the outer side of a vehicle wheel. In the automobile industry there is a never ending search for wheel cover constructions which are unusually pleasing to the public eye. The present invention is directed toward a cover construction which includes inner and outer cover members having converging portions locked together in assembly to simulate a one-piece deeply drawn cover having a massive crown area.

Accordingly, it is an object of this invention to provide cover retaining means which are capable of retaining a cover having the aforementioned deeply drawn appearance on the wheel.

It will be appreciated that, in view of the present demand for deep drawn highly oranmental covers, such a structure more readily lends itself in manufacture to be made in two parts as opposed to one.

It is, therefore, another object of the invention to provide a novel two-part cover construction.

A still further object of this invention is to provide means in order to insure corotation of the outer cover member and the wheel in order that the valve stem will not be sheared off.

It is still another object of this invention to provide an improved wheel cover which lends itself to economical manufacture on a large production basis.

Yet another object of this invention is to provide a cover wherein the retaining means may be economically secured to the body part in said depression on the body part and wherein the retaining means also serves to center the cover on the wheel.

Other objects and features of this invention will more fully appear from the following detailed description taken in connection with the accompanying drawing which illustrates a single embodiment thereof and in which:

Figure 1 is a fragmentary side view of a wheel having mounted thereon a cover embodying the features of this invention;

Figure 2 is an enlarged fragmentary cross sectional view taken on substantially the line II—II of Figure 1 looking in the direction indicated by the arrow; and Figure 3 is an enlarged fragmentary elevational view highlighting the manner in which the outer cover member is interlocked with the clip mounted on the body part.

As shown on the drawings:

The reference numeral 10 indicates generally my novel cover construction which is adapted to be mounted on the outer side of a vehicle wheel and which includes radially inner and outer cover members 11 and 12.

The instant wheel includes as its component parts thereof an outer stepped tire rim flange 13 which is capable of carrying a tubeless tire 14 or the like having a valve stem 15 (Fig. 1) extending through one of the rim flanges in order to permit the tire to be inflated.

The tire rim 13 includes a base flange 16 which may be secured in any suitable fashion to a wheel body or spider 17. It will be noted that the instant spider 17 is of a particular construction and, accordingly, embodies features of the present invention.

The spider 17 includes a generally axially inwardly extending attachment flange 18 which is connected at its inner end to an annular generally radially inwardly extending flange 19. Secured to the radially inner end of the flange 19 is a generally axially outwardly and radially inwardly extending flange 20 which merges into an annular nose portion 21 and terminates in an annular axially inset flange portion 22. The flange portion 22 has a bolt-on flange 23 provided at its radially inner end and which flange 23 is adapted to be secured by screws or the like to a wheel axle (not shown).

The flanges 18, 19 and 20 define together an annular relatively deep axial recess 24 of sufficient radial dimension in order to be capable of receiving a corresponding deeply axially inset portion of the cover 10.

The flange portion 22 has secured thereto by means of rivets 25 a plurality of circumferentially spaced spring clips 26 which are of such a construction as to normally open into the recess 24.

The clip 26 includes as components an attachment portion 27 which is secured to the inset flange portion 22 by means of the rivet 25. The attachment flange 27 is connected to a nesting portion 28 which is adapted to nestingly engage the nose portion 21 of the body part. The portion 28 is connected to a radially and axially outwardly extending radially inwardly curving portion 29 which merges into a generally axially inwardly extending lead-in portion 30 and is in turn connected to a radially and axially inwardly extending portion 31 and terminates in a radially outwardly axially inwardly extending terminal 32. At the junction of the portions 31 and 32 is an edge 33 which is adapted to bottom on the body part 17 when the cover is mounted on the wheel. As is best seen in Figure 3, it will be noted that clips 26 have radially extending reinforcing corrugations 34—34 formed thereon.

The outer cover member 12 includes diverging cover portions 35 and 36 which merge into annular rib 37. The cover portion 35 terminates in a pry-off underturned terminal 38 adapted to overlie the outer portion if the tire rim 13. Cover portion 36 has a plurality of circumferentially spaced notches 39 including radially inner and outer edges 40 and 41 and terminates in a curled reinforced terminal 42.

The inner cover member 11 includes a massive circular crown 43 which merges into an annular side wall 44 terminating in a gripping bead 45.

In the assembly and operation of my novel wheel structure, the outer cover member has an opening 46 through which the valve stem 15 is adapted to extend. It is in this manner that the slots 39 are axially aligned with the clips 26. Thereafter the clips are urged axially inwardly with edge 45 progressively flexing the resilient leg 30 until the member 12 snaps behind the shoulder 47 defined by the junction of portions 30 and 31 of the clip. Thus the outer cover member is interlocked in the slots 39 to insure co-rotation in assembly.

The inner cover member 11 is then axially aligned with the clips; the annular bead 45 contacting the resilient clip portion 30. Upon the application of an axially inward force, the bead 45 is snapped behind the shoulder 47 into retaining engagement thereby further tensioning the outer cover member on the wheel. In assembled relationship, the edge 33 is bottomed on the body portion 20 to provide a back-up. In addition, the outer cover portion 36 is bottomed against the body nose portion 21, the sole place of engagement between the wheel and outer cover member 12.

In view of the foregoing it will be now appreciated how nested inner and outer cover members 11 and 12 may be engageable over the nose portion 21 for projection axially into the recess 24. The spring clips 26 each have a goose-neck-like terminal turned back upon itself into the recess in proximity to and over the inclined surface of the nose portion 21 to retainingly engage nested members to secure them together. In addition, the clips have a free terminal end 33 cammingly engageable with the inclined surface 20 axially to the rear of the nested cover members to guide and cushion the cover members on the wheel.

In utilizing a cover of the instant construction it will now be appreciated that by virtue of retaining the cover members 11 and 12 in assembled relation on the wheel in such a manner that the converging portion 35 and side wall 44 are junctioned axially in said depression 24, a deeply drawn one-piece cover appearance may be attained.

Still further, a firm cover and wheel engagement may be achieved in assembly since the annular bead 45 serves to augment the tensioned engagement effected upon the outer cover member.

Removal of the cover is accomplished by inserting a suitable pry-off tool under the bead 45 and forcing the bead out of engagement with the clip. Likewise, a suitable tool may be inserted under the bead 38 to lever the outer cover member 12 out of engagement with the body part.

It will be understood that modifications and variations may be effected without departing from the novel concepts of the present invention.

I claim as my invention:

1. In a wheel structure including a wheel having a tire rim and body part provided with an inclined central nose portion leading axially rearwardly into an annular grooved portion defining a recess in the body part on the radially outer side of the central nose portion, nested inner and outer circular wheel cover members telescopingly engageable over said nose portion projecting axially into said recess on the radially outer side of the central nose portion, and cover retaining and cushioning spring clips carried by the wheel body part each of which having a gooseneck like terminal turned back upon itself into the recess in proximity to and over the inclined surface of the wheel nose portion retainingly engageable with nested portions of both of said cover members to secure them together and each clip having a free terminal end portion cammingly engageable in bottoming backed-up relation with and slidable along the inclined surface of said wheel nose portion to guide and cushion the cover members contemporaneously with the retaining of them together.

2. In a wheel structure including a wheel having a tire rim and body part provided with an inclined central nose portion leading axially rearwardly into a grooved portion defining a recess in the body part on the radially outer side of the central nose portion, nested inner and outer circular wheel cover members telescopingly engageable over said nose portion for projection axially into said recess on the radially outer side of the central nose portion, and cover retaining and cushioning spring clips carried by the wheel body part each of which having a gooseneck like terminal turned back upon itself into the recess in proximity to and over the inclined surface of the wheel nose portion retainingly engageable with nested portions of both of said cover members to secure them together and each clip having a free terminal end cammingly engageable with and slidable along the inclined surface of said wheel nose portion to guide and cushion the cover members contemporaneously with the retaining of them together, said clip terminal engaging said inclined nose portion axially to the rear of the nested engagement of the cover members.

3. In a wheel structure including a rim and body part with the body part carrying a plurality of circumferentially spaced spring clips provided with their free ends extending radially outwardly into a grooved portion defining a recess, a cover for disposition on the outer side of the wheel including radially inner and outer cover members each having generally axial cover portions extending into the depression defining together a deeply drawn simulating one-piece cover, said radially outer cover member comprising a ring having an inner marginal ring portion slotted at circumferentially spaced intervals and defined by edges to interlockingly receive at least a portion of the clip in the slots against the edges to insure relative co-rotation of the wheel and outer cover member, said axial cover portion on said radially inner cover member having a terminal capable of snap-on, pry-off engagement with the clip which terminal is bottomed against the radially outer ring member at the axially inner end area of its generally axial cover portion locking the ring member in assembly on the wheel.

4. In a wheel structure including rim and body parts with the body part having an axially inset depression and a plurality of circumferentially spaced clips on the body part having a radially outwardly extending deflectable terminal extending into the depression, a cover including inner and outer cover members with the outer cover member having circumferentially spaced slots defined by edges to interlockingly engage with deflectable terminal of the clips, and with said inner cover member having an axial terminal in snap-on, pry-off engagement with the clips and the clip terminals being bottomed against the body part to afford a back-up thereby supplementing the gripping engagement of the cover members.

5. In a wheel structure including rim and body parts with the body part having a plurality of circumferentially spaced clips on the body part each having a clip terminal extending generally radially outwardly, a cover including inner and outer cover members with the outer cover member comprising a ring having circumferentially spaced slots at its radially inner margin defined by edges to interlockingly engage with the clips, and with said inner cover member having an axial terminal in snap-on, pry-off engagement with the clips urging the clip terminals into bottoming engagement against the body part to afford a back-up thereby supplementing the gripping engagement of the cover members, said axial terminal also bearing against the ring radially outwardly of the slots to secure the ring against axial movement.

6. In a wheel structure including rim and body parts with the body part having a deeply inset axial grooved portion defining a recess and provided with a bulging portion on the radially inner side of the recess and circumferentially spaced spring clips each having a terminal extending into the recess and bottmingly opposing said bulging portion, and inner and outer cover and ring members provided with converging cover and ring portions extending into the recess with the inner margin of the outer ring portion at an area radially and axially outwardly of the bulging portion having circumferentially spaced slots through which the clips project and defined by edges on a terminal portion of same in interlocking engagement behind the clips and with said inner ring margin bottomed against the bulging portion, said inner cover member having a terminal in snap-on, pry-off engagement with the clips to press the clip terminals into bottoming engagement with the bulging body part portion and lock the cover members in assembly and sustain the inner ring margin bottomed against the bulging portion radially inwardly of the recess.

7. In a wheel structure including a wheel having rim and body parts with the body part having a deeply inset axial grooved portion defining a recess and provided with a bulging portion on the radially inner side of the recess and circumferentially spaced spring clips each having a terminal projecting into the recess, inner and outer cover members provided with converging cover portions extending into the recess on the radially outer side of the bulging portion with the outer cover portion having circumferentially spaced slots defined by edges on a terminal portion of same to retainingly engage with the clips, said inner cover member having a terminal capable of snap-on, pry-off engagement with the clips to lock the cover members in assembly and to bottom the clip terminals against the body part, the clip terminals having inclined portions engaged against and slidable on the body part recess responsive to impact forces to cushion the engagement of the cover members with the wheel.

References Cited in the file of this patent
UNITED STATES PATENTS

| | | |
|---|---|---|
| 2,401,492 | Lyon | June 4, 1946 |
| 2,491,501 | Lyon | Dec. 20, 1949 |
| 2,598,705 | Lyon | June 3, 1952 |